United States Patent
Haub et al.

(10) Patent No.: US 6,944,427 B2
(45) Date of Patent: Sep. 13, 2005

(54) REDUCED CROSSMODULATION OPERATION OF A MULTIMODE COMMUNICATION DEVICE

(75) Inventors: David Haub, Crystal Lake, IL (US); Christopher Kurby, Elmhurst, IL (US); Richard Mach, Cary, IL (US); Louis Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 40 days.

(21) Appl. No.: 10/355,920

(22) Filed: Jan. 31, 2003

(65) Prior Publication Data

US 2004/0152429 A1 Aug. 5, 2004

(51) Int. Cl.[7] ............................. H04B 1/00; H04B 17/00
(52) U.S. Cl. ................... 455/63.1; 455/67.13; 455/295; 455/296
(58) Field of Search ............................. 455/63.1, 67.11, 455/67.13, 226.1, 226.2, 200.1, 232.1, 295, 296, 552.1, 553.1; 370/320, 335, 342

(56) References Cited

U.S. PATENT DOCUMENTS

| | | | | |
|---|---|---|---|---|
| 5,548,830 A | * | 8/1996 | Kennedy et al. | 455/200.1 |
| 5,697,081 A | * | 12/1997 | Lyall et al. | 455/552.1 |
| 5,758,271 A | * | 5/1998 | Rich et al. | 455/67.13 |
| 6,035,213 A | * | 3/2000 | Tokuda et al. | 455/553.1 |
| 6,208,849 B1 | * | 3/2001 | Cho et al. | 455/296 |
| 2002/0070803 A1 | | 6/2002 | Rzyski | |
| 2002/0149535 A1 | | 10/2002 | Toncich | |

FOREIGN PATENT DOCUMENTS

| | | |
|---|---|---|
| WO | WO 99/45653 A1 | 9/1999 |
| WO | WO 00/18023 A1 | 3/2000 |
| WO | WO 01/74000 A1 | 10/2001 |
| WO | WO 02/13401 A2 | 2/2002 |

* cited by examiner

Primary Examiner—Quochien B. Vuong
(74) Attorney, Agent, or Firm—Brian M. Mancini; Randall S. Vaas (57) ABSTRACT

A method to reduce crossmodulation in a multimode radio communication device with a transmitter, a receiver, and a second receiver (400) that operates in a receiver channel bandwidth (402) includes a step of measuring a first signal strength in the receiver channel bandwidth (404), a second signal strength outside of the receiver channel bandwidth (406), and a power level of the transmitter. A next step (408) includes determining a signal-to-crossmodulation interference ratio (SCMIR). A next step (410) includes calculating a SCMIR threshold. A next step (412) includes comparing the ratio to the threshold. A next step (416,420) includes increasing the linearity of the receiver if the ratio is less than the threshold.

25 Claims, 6 Drawing Sheets

REDUCED CROSSMODULATION OPERATION OF A MULTIMODE COMMUNICATION DEVICE

FIELD OF THE INVENTION

The present invention relates to the control of operating modes of a radio communication device. More particularly the invention relates to improving immunity to interferences during reception in a multimode radio communication device.

BACKGROUND OF THE INVENTION

New digital cellular communication systems, such as the Wideband Code Division Multiple Access (WCDMA) extension of the Global System for Mobile Communication (GSM) and Digital Cellular System (DCS) can utilize different operating modes for the transfer of digital information. For example, digital information can be transferred using two different duplex modes, Frequency Division Duplex (FDD) and Time Division Duplex (TDD), as are known in the art, and use different operating frequency bands. The GSM system operates in the 900, 1800 and 1900 MHz bands. In addition, a communication can share CDMA and Time Division Multiple Access (TDMA) aspects.

Multimode communication devices are designed to transmit and receive digital communications using operating systems chosen from a plurality of multiple access techniques including TDMA, CDMA, and GSM, and will combine some of these techniques and incorporate them into one device. The receiver portion of a dual mode communication device for example, is similar to those which are not dual mode but are adapted to receive a combination of signals in accordance with any of the systems above. For example, a device operating in a FDD mode can be transmitting in an uplink and receiving on a downlink on one operating system and receiving on a downlink on another operating system. In another example, a device can be required to occasionally operate in compressed mode, wherein the transmitter is turned off during certain reception periods.

In compressed mode, the gaps in reception are scheduled within the slot/frame structure so as to provide a transmission gap leaving an open time period for the device to perform interfrequency power measurement, acquisition of a control channel of another base station, and handover, for example. When in compressed mode, the information normally transmitted during a frame is compressed in time in order to maintain the amount of data transferred within a frame. However, the network system is penalized in capacity lost by the compressed event.

One method to alleviate data throughput problems associated with utilizing a compressed mode is to have a second receiver in the communication device. The use of a second receiver eliminates the requirement for the communication device to use a compressed mode in the downlink. However, it may still be a requirement for the device to use a compressed uplink mode. For example, a communication device can be transmitting on the uplink while receiving on the downlink and monitoring another downlink using the second receiver. Unfortunately, there are cases where the transmitter and receiver frequencies can crossmodulate causing intermodulation distortion. In particular, crossmodulation arises when the communication device transmitter leakage modulates an interferer in a receiver. Crossmodulation manifests itself in receiver stages with insufficient linearity such as mixers and amplifiers. The non-linearities create higher-order frequency intermodulation products which may fall in-band in a receiver causing interference. In particular, a receiver gain stage, can be a large source for intermodulation distortion due to its early placement in the receiver input path (i.e. the gain stage has the most exposure to transmitter leakage). A mixer also manifests undesired non-linear behavior and can allow crossmodulation. Crossmodulation problems are understood in duplex CDMA systems where it leads to high third-order intercept performance requirements and thus high current dissipation requirements. Therefore, it has often been a choice, while receiving a non-duplex signal in a multi-mode device, to use a compressed mode to allow non-transmission time for the device to accurately receive signals without distortion or interference caused by crossmodulation.

In practice, the typical receiver circuitry in a communication device comprises a preselector portion that functions to perform initial filtering, an amplifier portion for amplification of the desired signal within a bandwidth, and a mixer portion providing frequency conversion of the signal to an intermediate frequency (or direct conversion) for further processing by a backend portion of the receiver which performs digital signal processing on the signal. Controlling the amplification of the incoming signal power of a radio frequency receiver is essential to maintain adequate signal levels within successive stages of the receiver within the operating range of the front end and later stages of baseband circuitry and provide proper operation of the receiver. Out-of-band signals, such as signals out of the licensed spectrum band, and in particular, signals out of the channelized band can be interferers. This out-of-band signal power along with intermodulation products degrade receiver performance resulting in decreased signal-to-noise (or carrier-to-interference) ratio and degraded receiver sensitivity. This may occur when interfering signals are strong compared to the desired in-channel signal, i.e. blocking, or strong with respect to the usable linear region of the various stages within a receiver. This results in the desired in-channel signal being degraded due to undesired signals being translated (frequency shifted) into the desired band. Therefore, it is necessary to maintain the received signal power at various stages (RF, IF and baseband) within their respective usable linear operating signal power ranges.

Filtering is ineffective here since interference and intermodulation products may have been frequency translated to the desired channel, allowing them to pass through to the receiver backend. Compressed mode can alleviate some of these problems, however, it is undesirable to use compressed mode since system capacity is reduced and potentially data throughput reduced in the event that the device is resource limited. It is preferable to operate in an uncompressed mode, i.e. to simultaneously receive GSM and WCDMA while transmitting WCDMA. This mode is preferred by some service providers since it improves capacity. If compressed mode is used, it is very desirable to limit its use. Therefore, there is a need to reduce the effects of intermodulation distortion in an uncompressed mode.

Although the prior art has addressed crossmodulation in duplex CDMA receivers, some systems, such as a stand alone GSM receiver, do not have the performance to meet crossmodulation and high third-order intercept point requirements. Receiver design enhancements for the RF circuits are necessary to create a multimode handset used in uncompressed mode receiver architectures. For example, the low noise amplifier (LNA) for existing GSM receivers has a −5 dBm third-order intercept, whereas the low noise amplifier intercept point required during uncompressed reception is +11 dBm when considering the additional burden of crossmodulation and using a state of the art duplexer. Filtering out the transmitter power further within the duplexer or a diplexed filter is one solution which is currently beyond the available technology. Therefore, in order to meet the carrier-to-interference requirements, a low-noise amplifier (LNA) with exceptional linearity would be required. However, this adds to the cost of the device and would also lead to excessive current dissipation.

Reduction of distortion with concurrent decrease in linearity requirements can be achieved in multiple ways. One method is to use interference cancellation. However, interference cancellation techniques have not been viable to date due to implementation complexities. Another method is to use tunable RF circuits with increased selectivity. Again, tunable RF circuits/filters are not a viable technology to date. Also, a tunable filter may not help the crossmodulation problem, such as if a GSM reception is on one side of the receiver frequency band and a WCDMA reception/transmission is on the other side of the receiver frequency band.

Another technique to reduce the current drain penalty is to use linearity-on-demand systems, which dynamically adjust the linearity of a receiver based on transmitter power levels, received channel signal strength, and channel quality measurements (e.g. frame error rate or Ec/Io) as a metric to change the gain or current to the receiver channel gain stage. However, channel quality can be degraded by other things besides intermodulation. Therefore, the prior art would improperly supply corrections (requiring more current) even if intermodulation were not the cause of the present degraded signal condition. Moreover, the above techniques are limited to all CDMA systems where a CDMA quality metric is used and thus these methods do not address the GSM case. Furthermore, these techniques do not address the simultaneous reception scenario where the mobile device can switch to uplink compressed mode if needed to avoid the crossmodulation degradation in the non-duplex receiver.

Therefore, there is a need to improve reception in a multimode communication device, particularly with respect to uncompressed and GSM modes. It would also be of benefit to provide this improvement without the need for consistently maintaining high linearity stages and their associated current drain. It would also be an advantage if distortion reduction can be accommodated with a shared gain stage between the receiver channels. It would also be an advantage if a device can operate in compressed mode under certain scenarios to avoid crossmodulation but would be operated in uncompressed mode the rest of the time, and for normal traffic cases. It would also be advantageous to provide these improvements without significant additional hardware or cost in the communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a unique method to improve reception in a multimode receiver circuit for a wireless communications device in a communication system. The invention also addresses compressed, uncompressed, and GSM modes of operation. In particular, the present invention reduces the effects of intermodulation distortion from crossmodulation by improving linearity of the receiver only when intermodulation is detected or anticipated, and while allowing operation in uncompressed mode, thereby improving data throughput. This improvement is accomplished without any significant additional hardware or cost in the communication device. Instead of incorporating high linearity circuitry, which in turn adds cost and increases current drain, the present invention advantageously utilizes the existing circuitry in combination with solutions for processing of the RF input signals necessary in a multimode communication device. This invention further allows selective operation in compressed mode only when needed as based on anticipated interference thus allowing uncompressed mode operation a majority of the time thereby improving data throughput.

Specifically, the present invention resolves the problems of the prior art by using in-band and out-of-band received signal strength estimates to decide if linearity reduction is allowed, rather than use a CDMA channel quality metric. The present invention also accommodates the possibility of a shared resource between receivers, such as a receiver gain stage (e.g. low noise amplifier), such that linearity changes consider the status of both receivers. Finally, the present invention allows a compressed mode override that forces the duplex transceiver transmitter into compressed mode under special circumstances, as will be detailed below Turning to FIG. 1, a block diagram of a prior art communication device is shown. Typically, this device is a duplex CDMA cellular radiotelephone. The device includes a transmitter 100 and a receiver circuit 102, which can communicate simultaneously, although in different frequency bands, through a duplexer filter 104 with an antenna 106. The device is controlled by one or more of a microprocessor (not shown), microcontroller, or digital signal processor 108 (DSP), which generate the necessary communication protocol for operating in a compatible cellular system and can perform many other functions for the wireless communication device, such as writing to a display, accepting information from a keypad, communicating through a user interface, audio, etc. These devices are not shown for simplicity of the figures.

Figure 1:
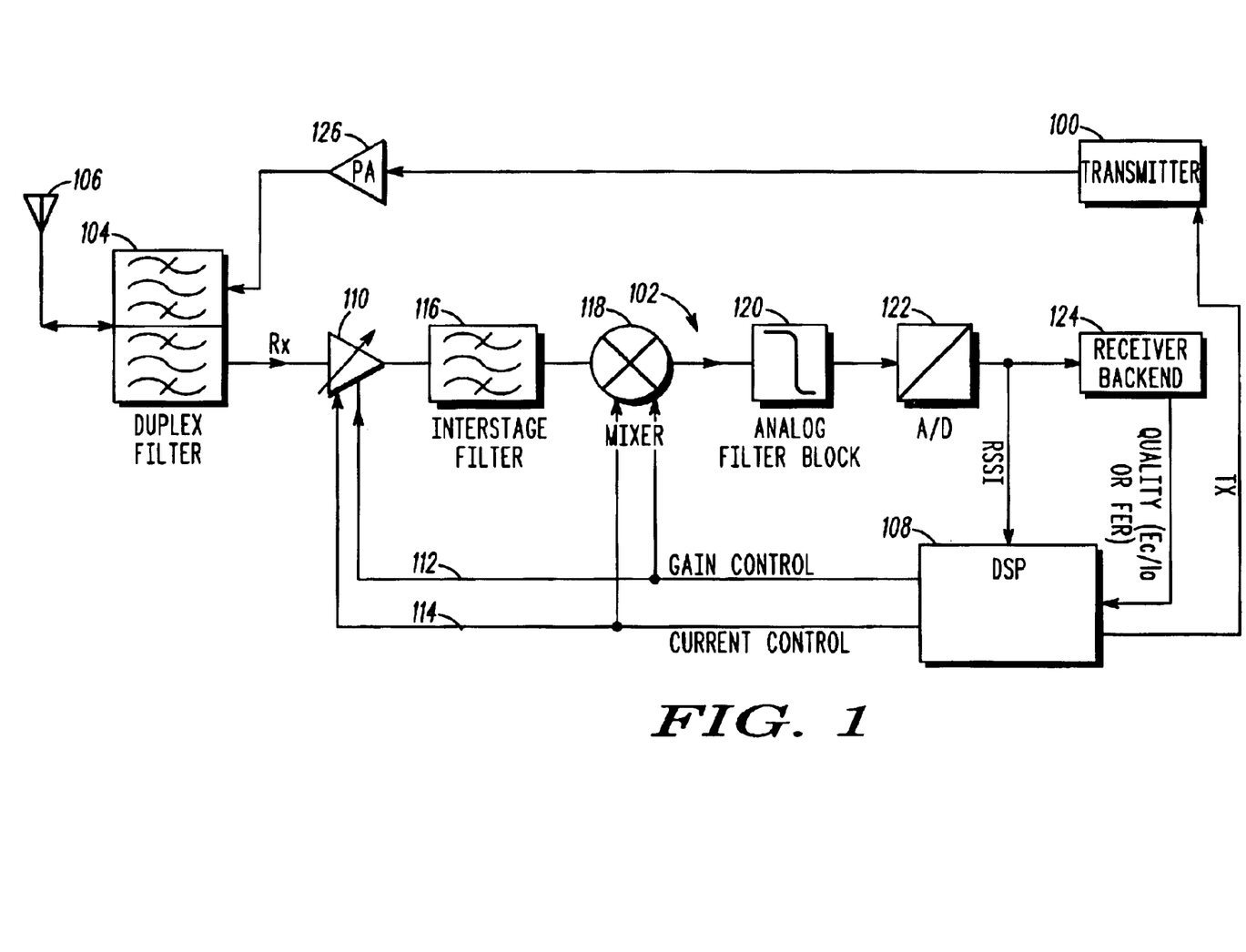
FIG. 1 shows a block diagram of a prior art multimode communication device.

The DSP 108 can control receiver linearity by adjusting a gain stage 110 and mixer 118 through a gain control 112 or a current control 114. The receiver circuit path also includes interstage filtering 116, analog filtering 120, and analog-to-digital conversion 122 for the receiver backend 124, as are generally known in the art. The DSP 108 includes a demodulator, signal processing, and other circuitry known in the art to perform baseband conversion and appropriate active filtering which is necessary for demodulation of the desired communication signal. The DSP 108 also determines a received signal strength indication (RSSI) for the receiver channel and can use digital processing to determine a quality of the receiver channel (i.e. frame error rate (FER), Ec/Io (carrier-to-interference ratio), and the like).

The gain stage 110 is a pre-amp that uses automatic gain control (AGC) to control the signal gain input to the backend baseband circuit (demodulator) 124, since this circuit is susceptible to overload. The AGC maintains each stage's power level within the designed operating range so the receivers may function properly. The receiver circuit can be direct conversion or have one or more intermediate frequency stages. The mixer 118 converts the signal into a baseband representation which is then subsequently filtered 120 by an active baseband filter that allows primarily the desired communication signal to pass for further processing. Although filtered, noise and interference are on the desired communication signal frequency band, such as intermodulation products generated due crossmodulation with the co-transmitting power amplifier 126, pass on to further processing. After the filter 120, the signal is converted to a digital signal by the analog-to-digital converter 122. This converter takes all signals (desired communication signal and interference) and converts them to digital data bits which are then further processed including additional filtering and demodulation.

The digital signal processor 108 comprises a detector for detecting on-band interference from all sources including self-interference from the transmitter power amplifier 126 as well as external channel noise. The detector estimates the channel quality and the received signal strength to determine the proper amount of gain or current to supply to the gain stage 110 and mixer 118 to adjust the linearity thereof for reduced crossmodulation.

Figure 2:
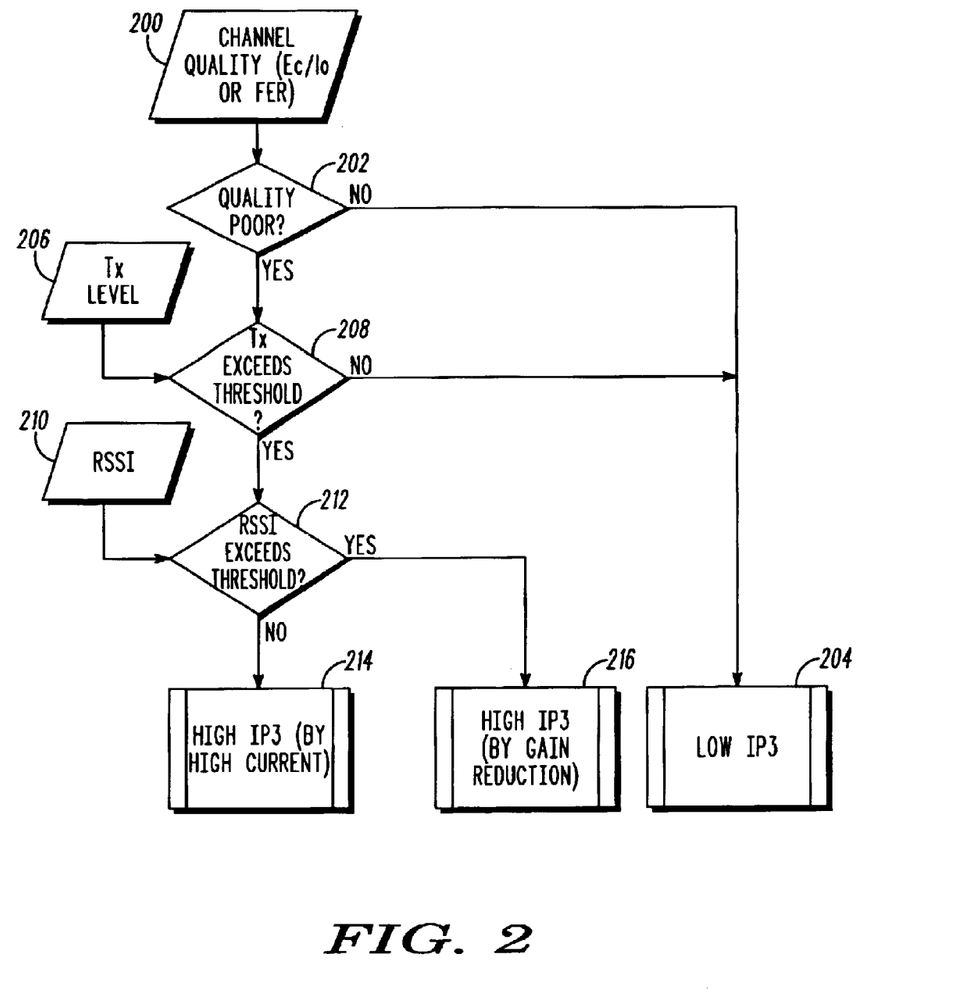
FIG. 2 is a flow chart illustrating the operation of the device of FIG. 1.

FIG. 2 shows a prior art technique for linearity adjustment for intermodulation reduction, used with the device of FIG. 1. The device first determines a received channel quality 200 using techniques known in the art. If the channel quality is good 202 then the effect of intermodulation and other noise sources are not significant and the device can operate nominally 204. However, if the channel quality is poor then intermodulation can be one of the causes. In this case, the transmitter power amplifier level is used and compared against a first threshold 208 that is empirically determined and is a function of system design. If the power level does not exceed the first threshold then the interference or distortion will not be anticipated as significant and the device can operate nominally 204. However, if the transmitter power level exceeds the threshold then crossmodulation can be the cause, and the prior art then calls for a linearity adjustment of the LNA and mixer.

What type of linearity adjustment to be used is decided by determining 210 a received signal strength indication (RSSI) and compared the RSSI with a second empirically determined threshold 212 to determine the type of operating condition adjustment (i.e. gain or linearity). In particular, if the RSSI is greater than the second threshold then there is sufficient signal present and a gain reduction would not further reduce the existing poor signal in relation to the interference (S/I). In other words, if the signal were small (small RSSI), then S/(N+I) would be the proper representation, as a result of a gain reduction. The signal and interference would now be smaller, while noise is a constant and relatively larger. However, the distortion products within the receiver are reduced greatly by lowering a gain 216 of the gain stage 110 and mixer 118 of the receiver thus improving the existing poor signal in relation to the interference. Lowering the gain is preferred as current dissipation is typically reduced for reduced gain. However, if the RSSI is below or equal to the second threshold 212 (i.e. not enough signal) then lowering the gain would incur a more negative penalty, since there is not enough signal in the first place, and the linearity increasing adjustment is accomplished by increasing current 214 to the gain stage of the receiver.

The present invention is different in several respects from the above prior art. First, channel quality is not used for a crossmodulation determination since channel quality can be degraded by many other causes than crossmodulation. Second, an out-of-band received signal strength indication is used in the crossmodulation determination. And third, the threshold(s) used in evaluating whether to adjust linearity are formulated differently than in the prior art.

Figure 3:
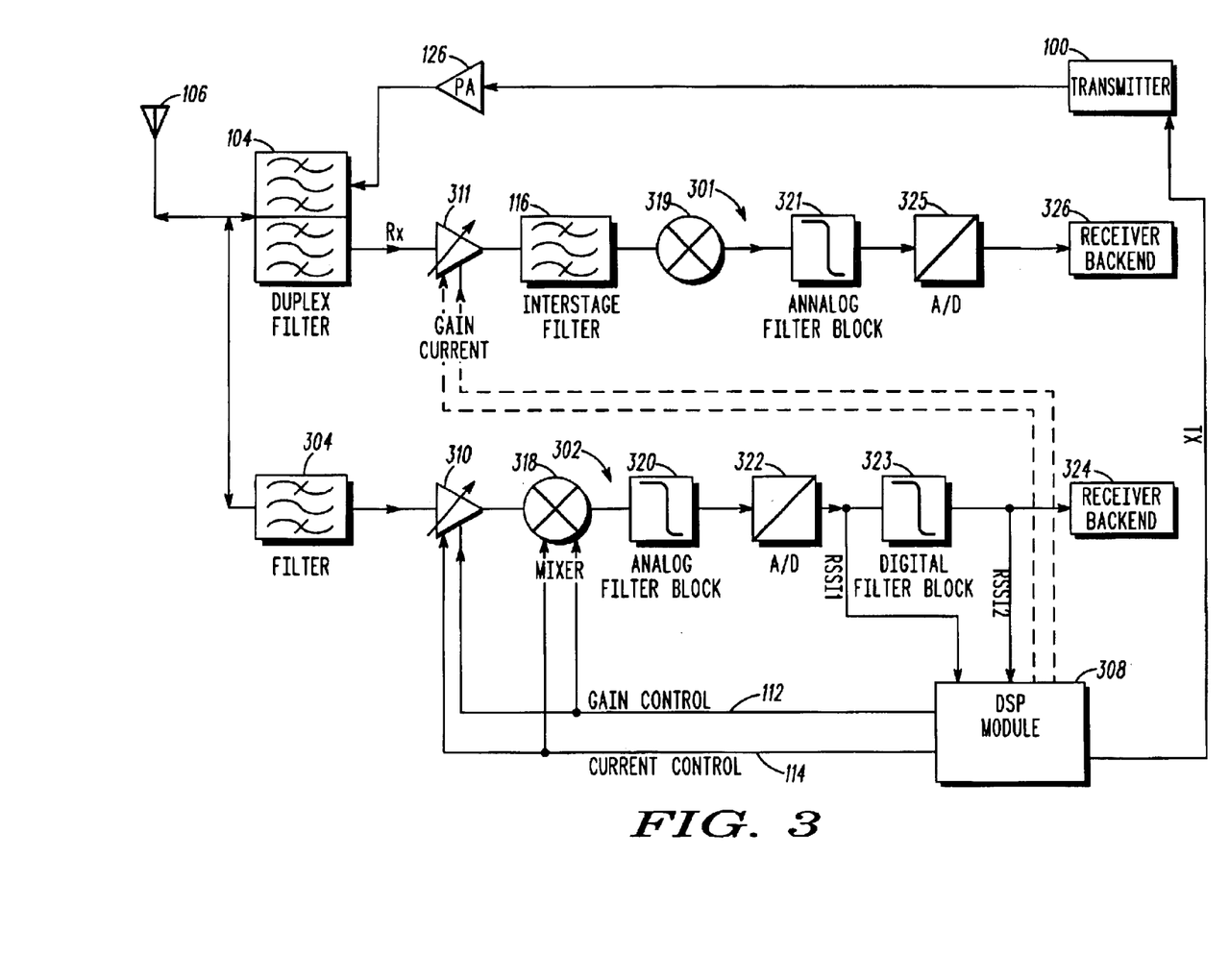
FIG. 3 shows a block diagram of a first embodiment of a multimode communication device, in accordance with the present invention.

Turning to FIG. 3, a block diagram is shown of a multimode communication device, such as are operable in GSM and WCDMA communication systems, in accordance with the present invention. Preferably, this device is a cellular radiotelephone incorporating the present invention. The device includes a transceiver including a transmitter 100 as before and a receiver circuit 301, which can communicate simultaneously, although on different frequency bands, through a duplexer filter 104 with an antenna 106. A second receiver circuit 302 (and optionally a second transmitter circuit which is not shown) is also incorporated in the present invention and is coupled to the antenna 106 with its own filter 304. The two receivers 301, 302 can be identical and are generally used for receiving RF signals in the same frequency band. However, operation of the present invention is not limited in this way and can be used for receiving RF signals from two distinct frequency bands.

The device is controlled by one or more of a microprocessor (not shown), microcontroller, or digital signal processor (DSP) module 308 (which can be a portion of the device DSP), which generate the necessary communication protocol for operating in a compatible cellular system and for performing many other functions for the wireless communication device, such as writing to a display, accepting information from a keypad, communicating through a user interface, audio, etc. (not shown for the simplicity). The DSP module 308 can control receiver linearity of the second receiver by adjusting its gain stage 310 and mixer 318 through a gain control 112 or a current control 114. The DSP module 308 of the second receiver can also control the receiver linearity of the first receiver by adjusting the respective gain stage 311 and mixer 319 of the first receiver through a separate gain control or a current control. Alternatively, a separate DSP module can be provided for both receiver channels. The second receiver channel does not typically require an interstage filter for reduction of transmitter leakage and crossmodulation (although it could include it if this channel were also to be used for communication along with the first receiver channel). The second receiver does include a mixer 318, analog filtering block 320, an analog-to-digital converter 322 for the receiver backend 324 and a digital filter block 323 after the ADC 322.

A novel aspect of present invention is the use of an ADC 322,325 that is different from the prior art since it is a wide-range, wide bandwidth unit, which is needed for out-of-band signal strength measurements. The DSP module 308 determines an out-of-band received signal strength indication (RSSI1) and an in-band received signal strength indication (RSSI2) for the second receiver channel, which are both passed by the ADC 322. RSSI1 and RSSI2 are ultimately used to determine linearity adjustments, as will be described below. The DSP module is in effect a detector for detecting intermodulation distortion due to crossmodulation of the leakage from the PA 126 with an interferer. The detector uses the in-band and out-of-band received signal strengths from the second receiver 302, as well as transmitter power level information from the PA 126 of the duplex transceiver, to determine the proper linearity adjustment for the gain stage(s) 310 and mixer(s) 318 for reduced intermodulation. Based on the two RSSI measurements and the transmitter power level a signal-to-interference ratio can be calculated, wherein if the signal-to-interference ratio exceeds a predetermined threshold, then the linearity of the receiver is increased using either increased current or gain change depending on the in-band signal estimate (RSSI2), as will be explained below. Alternatively, the uplink is compressed and the linearity of the receiver is not increased.

Figure 4:
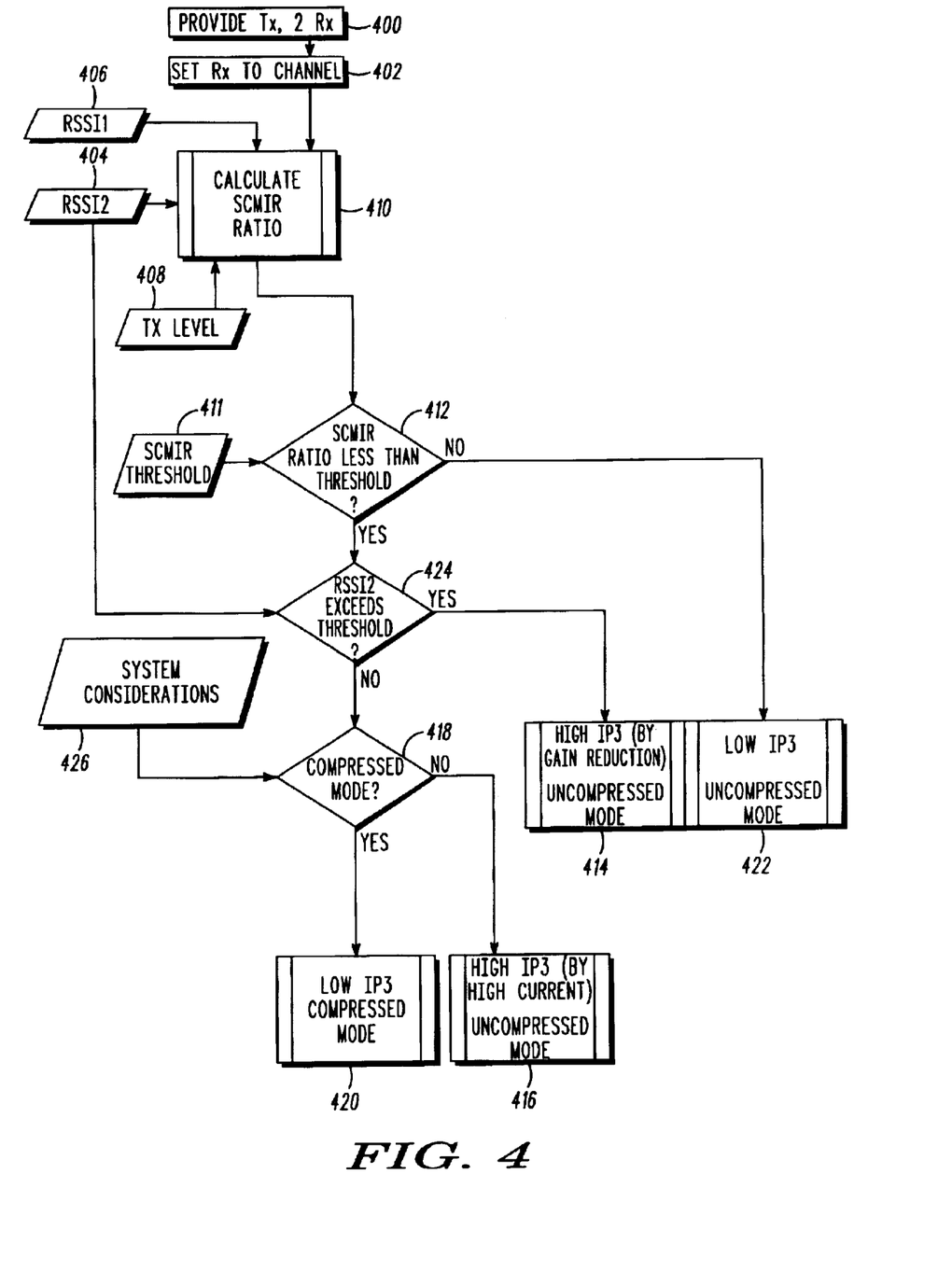
FIG. 4 is a flow chart illustrating the operation of the device of FIG. 3.

FIG. 4 illustrates a method to reduce crossmodulation in a multimode radio communication device in a multimode communication system, in accordance with the present invention. The method finds best application in a multimode GSM and WCDMA communication system. For example, GSM receivers are not designed for duplex operation since GSM receivers and transmitters operate in different time slots in a TDMA system. Therefore, GSM receivers cannot operate simultaneously with a wideband (or CDMA) transmitter without crossmodulation issues. In this embodiment, the communication device is provided 400 with a transceiver and at least a second receiver. The second receiver can be operated on the same frequency band (co-band) as the first receiver, but this is not a requirement, so that the receiver and the monitoring receiver can operate in different frequency bands with different signal levels. The transmitter has an associated power amplifier and the receivers have associated gain stages. In an alternate embodiment, the receivers share a gain stage (e.g. low noise amplifier) and possibly an interstage filter, as will be discussed below.

The second receiver is set to an operating frequency band 402 in order to determine the quality and signal strength of alternate channels or to decode information from the other system. A next step 404 includes determining a first received signal strength indication (RSSI2) within the channel bandwidth on the second receiver. A next step 406 includes determining a second received signal strength indication (RSSI1) outside of the channel bandwidth of the same receiver. This can be accomplished since the ADC 322 is a wideband unit that also passes out-of-band signals. The in-band signal is obtained after the out-of-band signal by using a digital filter block on the receiver channel which passes primarily the in-band signal assuming the interference is within the levels specified by communication standards. A next step 408 is determining a power level of the transmitter of the device. Next a signal-to-crossmodulation interference ratio (SCMIR) is calculated 410 for the transmitter power level using the lowest IP3 setting of the LNA gain stage 310. The SCMIR ratio is used in the final determination for adjusting a linearity of the receiver gain stage. Specifically, the ratio is determined by $$SCMIR(dB) = RSSI2 - (2P_{tx} + RSSI1 - 2IP3 + K)$$

where (in dBm), RSSI2 is the in-band received signal strength, $P_{tx}$ is the power level of the transmitter power amplifier, RSSI1 is the out-of-band received signal strength, IP3 is the lowest (worst case) input third-order intercept point, and K is a constant related to the relationship between crossmodulation and third-order intercept that can be calculated or determined empirically. The lowest input third-order intercept point is used since this involves the least current drain. Furthermore, a SCMIR threshold is provided 411 based on system calculations. Specifically, the SCMIR threshold is determined empirically using known system SNR requirements based on the communication system specification and expected variations in measured parameters such as RSSI and transmitter power level.

The SCMIR ratio is then compared 412 to the desired SCMIR threshold, wherein if the ratio is less than the threshold then the linearity of the receiver is increased, such as by increasing the linearity of the gain stage and/or mixer. Alternatively, the operation mode of the device could be changed to compress the uplink by changing the station class mark. If the SCMIR ratio is greater than or equal to the SCMIR threshold then the linearity is not adjusted and uncompressed operation is maintained 422. Increasing linearity can be achieved by either lowering a gain 414 of the gain stage and mixer of the receiver, increasing current 416 to the gain stage and mixer of the receiver, or both. In a preferred embodiment, the adjustment of linearity is also dependent upon the first (in-band) signal strength exceeding a second threshold that is determined empirically. In particular, if the SCMIR ratio is below the SCMIR threshold 412 and the first signal strength is above the second threshold 424 (i.e. adequate SNR) then the receiver linearity increase is accomplished by lowering the gain of the gain stage and mixer of the receiver. However, if the SCMIR ratio is below the threshold 412 and the first signal strength is below or equal to the threshold 424 (i.e. insufficient SNR) then the linearity increase is accomplished by increasing a current to the gain stage and mixer of the receiver. The DSP module(s) can adjust the gain stage and mixer of each receiver differently depending on the received signal strength. The method described above is repeated periodically to update the operating condition of the device based on changes in the signal conditions.

Optionally, the present invention contains the further steps of setting 418 the operating mode of the device, and placing 420 the receivers in a low-current and low-linearity mode if the compressed uplink operating mode is allowed and desired. For example, if the device desires to conserve current drain due to the battery status, the device would switch to uplink compressed mode to maintain good reception rather than using increased current drain to maintain good reception. There are many variables 426 associated with the decision to operate in compressed mode. These variables can be internal and external to the device and include transmitter power, required third-order intercept performance versus capability, the amount of network traffic, the battery status of the communication device, the user cost, the service provider preference, etc.

Figure 5:
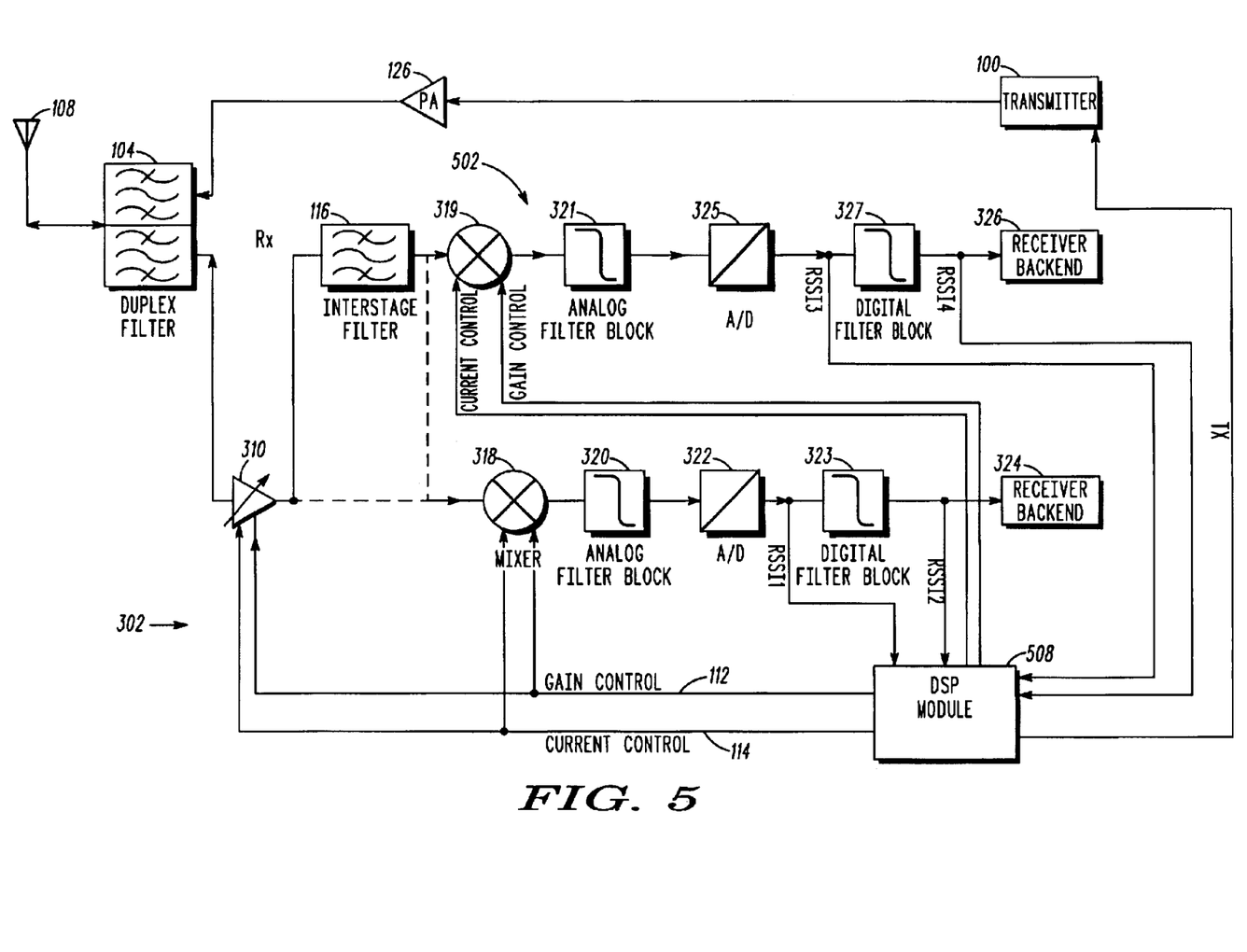
FIG. 5 shows a block diagram of an alternate embodiment of a multimode communication device, in accordance with the present invention.

FIG. 5 shows an alternate embodiment of the present invention that is the same as the previous embodiment with the exception of shared frontend resources between the receivers. In particular, a gain stage 510 is shared between the two receivers, and optionally an interstage filter 116 is shared, which is necessary for co-band operation. In this shared embodiment, the threshold algorithm is similar to the previous case except the linearity reduction of the shared resource, i.e. the LNA, requires that the DSP analyze the linearity needs for both the receiver of the duplex transceiver as well as the second receiver, and adjust the LNA to meet the linearity needs of the worst case.

As before, the communication device includes a transceiver including a transmitter 100 and a receiver circuit 502, and a second receiver circuit 302, all of which now can communicate through a duplexer filter 104 with an antenna 106. The two receivers 502, 302 are receiving RF signals in the same frequency band and share the same gain stage 510, and possibly the interstage filter 116. The device is controlled by a digital signal processor (DSP) module 508, in the same way as previously described for the first embodiment of the present invention. The DSP module 508 controls linearity of both of the receivers by adjusting their common gain stage 510 through a gain control 112 or a current control 114. However, the DSP module 508 can provide separate gain 512 and current 514 controls for the mixer of the first receiver. The second receiver 302 does not typically require interstage filtering, but can share with channel 502 if both receivers are expected to receive with the transmitter active. The second receiver 302 includes a mixer 318, analog filtering block 320, an analog-to-digital converter 322 for the receiver backend 324 and a digital filter block after the ADC 322. The ADCs 322, 325 are again a wide-range, wide bandwidth unit for both receivers. The first receiver 502 does include the interstage filter 116, and similarly a mixer 319, analog filtering block 321, an analog-to-digital converter 325 for the receiver backend 326 and a digital filter block 327 after the ADC 325.

In this embodiment, the DSP module 508 determines an out-of-band received signal strength indication (RSSI1) and an in-band received signal strength indication (RSSI2) for the second receiver channel 302, as well as an out-of-band received signal strength indication (RSSI3) and an in-band received signal strength indication (RSSI4) for the receiver channel 502, which are ultimately used to determine the linearity adjustment for the common gain stage 510. The DSP module 508 comprises a detector for detecting interference and inferring intermodulation distortion due to cross modulation of the PA 126 transmitting signal with an interferer. The detector uses the in-band and out-of-band received signal strengths from the first receiver 502 and second receiver 302, SCMIR threshold values for both receivers 302 and 502, as well as transmitter power level information, to determine the proper amount of gain or current to supply to the gain stage 510 and mixers to adjust the linearity thereof for reduced intermodulation distortion. Based on the four RSSI measurements, two SCMIR ratios can be calculated, wherein if the SCMIR ratio is less than either associated SCMIR threshold, then the linearity of the receiver is increased using either increased current or lowered gain depending on the in-band signal estimates (RSSI2 and RSSI4), as will be explained below. Alternatively, the device could be switched to uplink compressed mode to reduce current dissipation but maintain good reception.

Figure 6:
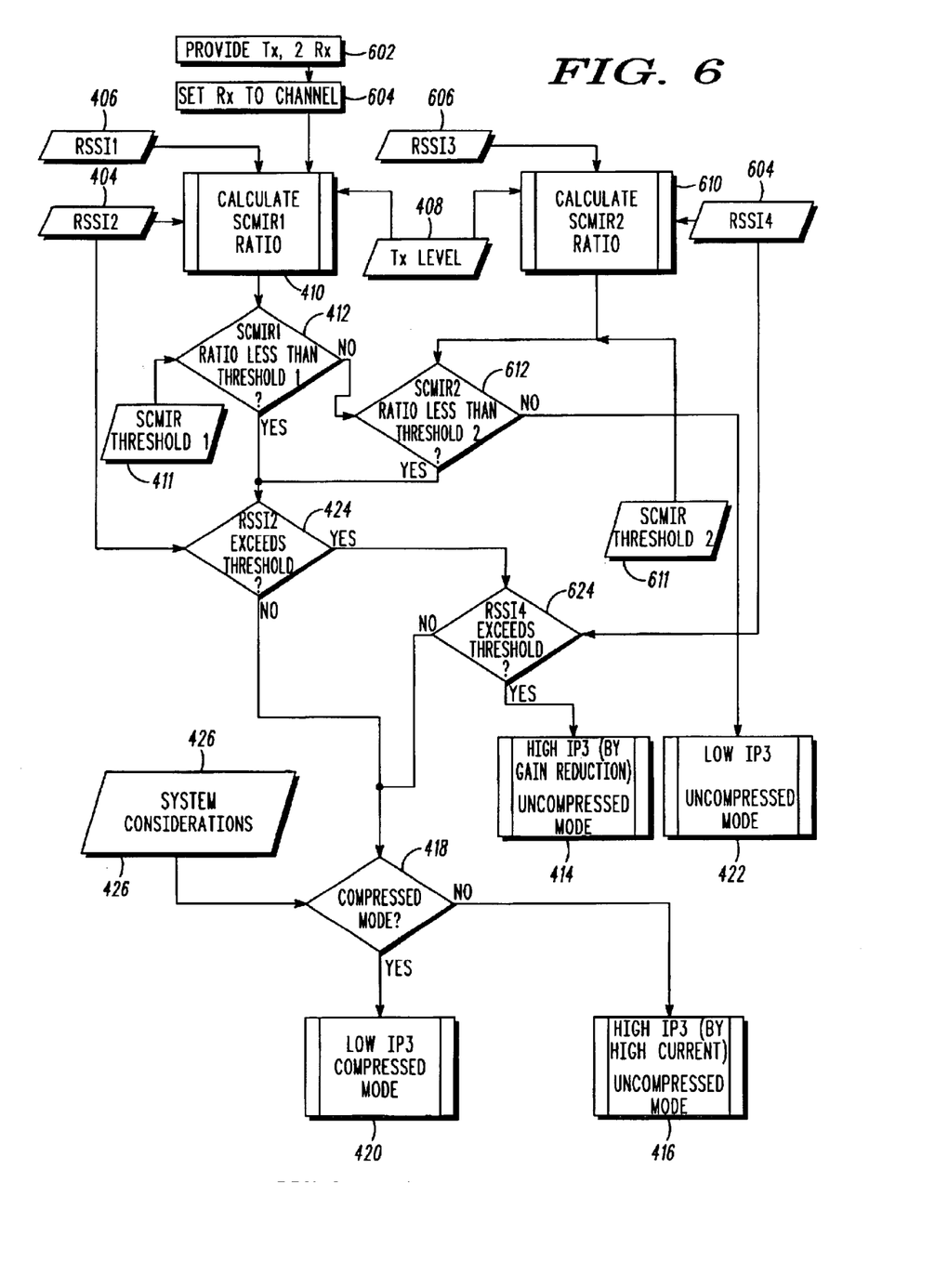
FIG. 6 is a flow chart illustrating the operation of the device of FIG. 5.

FIG. 6 illustrates a method to improve reception in a multimode radio communication device in a multimode communication system, in accordance with the present invention. As with FIG. 4, the communication device is provided 600 with at least one transmitter and two receivers. The receivers share a gain stage, such as a low noise amplifier for example. The multimode communication device will first have both of its receivers set to an operating frequency 602. A next step 404 includes determining a first received signal strength indication (RSSI2) within the channel bandwidth of the second receiver. A next step 406 includes determining a second received signal strength indication (RSSI1) outside of the channel bandwidth of the second receiver. The in-band signal is obtained by using a digital filter block on the receiver channel where the out-of-band signal is measured. Similarly, a third received signal strength indication is determined (RSSI4) within the channel bandwidth of the receiver, and a fourth received signal strength indication (RSSI3) is determined outside of the channel bandwidth of the receiver. A next step 408 is determining a power level of the transmitter of the device. Next SCMIR ratios are calculated 410, 610 for each of the receiver channels. As before, the associated SCMIR target thresholds 411, 611 are provided based on system calculations. The calculated ratios are used in the final determination for adjusting a linearity of the common receiver gain stage. Specifically, the ratios are determined by $$SCMIR1(\text{dB}) = RSSI2 - (2P_{tx} + RSSI1 - 2IP3 + K1)$$

$$SCMIR2(\text{dB}) = RSSI4 - (2P_{tx} + RSSI3 - 2IP3 + K2)$$

where RSSI2 and RSSI4 are the associated in-band received signal strength of the associated receivers, $P_{tx}$ is the transmitter power level, RSSI1 and RSSI3 are the associated out-of-band received signal strength of the receivers, IP3 is the lowest (worst case) input third-order intercept point, and Kx is a constant related to the relationship between cross-modulation and third-order intercept that can be calculated or determined empirically for each receiver channel.

The SCMIR1 ratio is then compared 412 to the SCMIR1 threshold, wherein if the ratio is less than the SCMIR1 threshold then the linearity of the receiver gain stage is increased. If the ratio is greater than or equal to the SCMIR1 threshold then the SCMIR2 ratio is then compared 612 to the SCMIR2 threshold, wherein if the SCMIR2 ratio is less than the SCMIR2 threshold then the linearity of the receiver gain stage is increased. If the SCMIR1 ratio is not less than the first SCMIR1 threshold and the SCMIR2 ratio is not less than the SCMIR2 threshold then linearity is not adjusted 422. Increasing linearity can be achieved by either lowering a gain 414 of the common gain stage and individual mixer of each receiver, or by increasing current 416 to the common gain stage and individual mixer of each receiver. Typically, the common gain stage is adjusted to meet the linearity requirements of the worst case channel intermodulation. In a preferred embodiment, the adjustment of linearity is also dependent upon the first and third received signal strength exceeding a signal level threshold, determined empirically from signal-to-noise ratios. In particular, if the SCMIR ratios are below both their respective thresholds 412, 612 and the first and third signal strengths are above their RSSI thresholds 424, 624 then the increasing adjustment of the linearity is accomplished by lowering a gain of the common gain stage and individual mixer of each receiver. However, if the SCMIR ratios are below both their respective thresholds 412, 612 and either of the first and third signal strengths are below or equal to their RSSI thresholds 424, 624 then the increasing adjustment of the linearity is accomplished by increasing the current drain to the common gain stage and individual mixer of each receiver. The method described above is repeated periodically to update the operating condition of the device based on changes in the signal conditions.

Optionally, the present invention contains the further steps of setting 418 the operating mode of the device, and placing 420 the receivers in a low-current and low-linearity mode if the uplink compressed operating mode of the device is allowed and desired. For example, if the device desires to conserve current drain due to the battery status, the device would switch to uplink compressed mode to maintain good reception rather than using increased current drain to maintain good reception. There are many variables 426 associated with the decision to operate in compressed mode. These variables can be internal and external to the device and include transmitter power, required third-order intercept performance versus capability, the amount of network traffic, the battery status of the communication device, the user cost, the service provider preference, etc.

Advantageously, the present invention addresses crossmodulation directly and separately from noise and interference than is done in the prior art. Moreover, the LNA used in a receiver channel need not be a high-linearity device. Therefore, it can be smaller and can be allowed to have non-linearities, which results in a more efficient (i.e. lower current) device. In the above embodiments, it should be recognized that the conditions under which the uncompressed mode or low current drain is achievable is also dependent on the transmitter level. In operation, at most times, a typical mobile communication device will be transmitting at low power levels (below 10 dBm). These levels of transmitter power lead to high SCMIR ratios and thus infrequent compressed mode or high current drain operation. Hence, the uncompressed or low current drain mode for GSM monitoring will be effective most of the time. Only occasionally would the mobile be required to compress WCDMA transmission or increase the current drain to monitor GSM cells.

The present invention finds particular application in maintaining optimum data capacity, and only operating in compressed mode where required by the system and environment. The method provides a process for the communication device to control linearity of the device to reduce the effects of intermodulation and crossmodulation. This is accomplished with existing hardware eliminating the need for additional circuitry hence saving space on the printed circuit board and within the integrated circuits. The ever-increasing capabilities of digital signal processor technology allows for the simultaneous measurements and operation of different modes of the communication signal to provide seamless control with very small chip die areas.

Although the invention has been described and illustrated in the above description and drawings, it is understood that this description is by way of example only and that numerous changes and modifications can me made by those skilled in the art without departing from the broad scope of the invention. Although the present invention finds particular use in portable cellular radiotelephones, the invention could be applied to any multimode wireless communication device, including pagers, electronic organizers, and computers. Applicants' invention should be limited only by the following claims.

What is claimed is:

1. A method to reduce crossmodulation in a multimode radio communication device, the method comprising the steps of:
    providing a multimode communication device with a transmitter, a first receiver, and a second receiver;
    operating the second receiver in a receiver channel bandwidth;
    measuring a first signal strength in the receiver channel bandwidth, a second signal strength outside of the receiver channel bandwidth, and a power level of the transmitter;
    determining a signal-to-crossmodulation interference ratio (SCMIR);
    calculating a SCMIR threshold;
    comparing the ratio to the threshold; and
    increasing the linearity of the first receiver if the ratio is less than the threshold.

2. The method of claim 1, wherein in the providing step the first receiver and the second receiver are operable in different frequency bands.

3. The method of claim 1, wherein the increasing step includes increasing the linearity dependent upon the first signal strength in relation to a signal level threshold.

4. The method of claim 1, wherein the increasing step includes increasing the linearity by lowering a gain of a gain stage of the first receiver if the SCMIR is below the threshold and the first signal strength is above a signal level threshold.

5. The method of claim 1, wherein the increasing step includes increasing the linearity by increasing current to a gain stage of the first receiver if the SCMIR is below the threshold and the first signal strength is below a signal level threshold.

6. The method of claim 1, further comprising the steps of determining a battery capacity of the device, and placing the first and second receivers in a low-current and low-linearity compressed mode to conserve battery power.

7. The method of claim 1, wherein the first and second receivers share a low noise amplifier gain stage.

8. The method of claim 1, wherein the SCMIR ratio of the determining step is determined by $$SCMIR = RSSI2 - (2P_{tx} + RSSI1 - 2IP3 + K)$$

where RSSI2 is the in-band received signal strength, $P_{tx}$ is the power level of the transmitter power amplifier, RSSI1 is the out-of-band received signal strength, IP3 is the input third-order intercept point, and K is a constant.

9. The method of claim 1, wherein the multimode communication device is operable in a GSM communication system and a WCDMA communication system.

10. A method to reduce crossmodulation in a multimode radio communication device, the method comprising the steps of:
    providing a multimode communication device with a transmitter, a first receiver, and a second receiver, both receivers sharing a common gain stage and each receiver including wide bandwidth analog-to-digital converters;
    operating both receivers in a channel bandwidth;
    measuring an in-band received signal strength and an out-of-band received signal strength for both of the receivers, and a power level of the transmitter;
    determining a signal-to-crossmodulation interference ratio (SCMIR) for each receiver;
    calculating SCMIR thresholds for each receiver;
    comparing each SCMIR ratio to at least one associated SCMIR thresholds; and
    increasing the linearity of the receiver if both SCMIR ratios are less than their associated thresholds.

11. The method of claim 10, wherein the increasing step includes increasing the linearity dependent upon the in-band signal strengths in relation to associated signal level thresholds.

12. The method of claim 11, wherein the SCMIR thresholds of the determining step are determined by $$SCMIR1 = RSSI2 - (2P_{tx} + RSSI1 - 2IP3 + K1)$$

$$SCMIR2 = RSSI4 - (2P_{tx} + RSSI3 - 2IP3 + K2)$$

where RSSI2 and RSSI4 are the in-band received signal strengths, $P_{tx}$ is the power level of the transmitter power amplifier, RSSI1 and RSSI3 are the out-of-band received signal strengths, IP3 is the input third-order intercept point, and K1 and K2 are constants.

13. The method of claim 10, wherein the increasing step includes increasing the linearity by lowering a gain of the common gain stage and a respective mixer of each receiver if both SCMIR ratios are below their respective SCMIR thresholds and both in-band signal strengths are above their respective signal level thresholds.

14. The method of claim 10, wherein the increasing step includes increasing the linearity by increasing current to the common gain stage and a respective mixer of each receiver if both SCMIR ratios are below their respective SCMIR thresholds and either of the in-band signal strengths are below their respective signal level thresholds.

15. The method of claim 10, further comprising the steps of determining battery capacity of the device, and placing the receivers in a low-current and low-linearity compressed mode to conserve battery power.

16. An apparatus to reduce crossmodulation in a multimode radio communication device with a radio frequency transmitter channel, a first radio frequency receiver channel, and a second radio frequency receiver channel, the communication device comprising:

a gain stage coupled in each receiver channel;

a power amplifier coupled in the transmitter channel; and a digital signal processor coupled to the transmitter and receivers, the digital signal processor adjusts a linearity of the gain stage in response to a signal-to-crossmodulation interference ratio (SCMIR) in comparison to a threshold.

17. The apparatus of claim 16, wherein the gain stage is a low noise amplifier that commonly feeds both receivers operable in the same frequency band.

18. The apparatus of claim 16, wherein the receivers are operable in different frequency bands.

19. The apparatus of claim 16, wherein the digital signal processor determines battery capacity of the device, and places the monitoring receiver in a low-current and low-linearity compressed mode to conserve battery power.

20. The apparatus of claim 16, wherein the communication device is operable in a GSM communication system and a WCDMA communication system.

21. The apparatus of claim 16, wherein the digital signal processor determines and in-band received signal strength and adjusts the linearity of the receivers dependent upon the in-band received signal strength relative to a signal level threshold.

22. The apparatus of claim 21, further comprising a gain control supplied by the digital signal processor to the gain stage and mixer of each receiver, wherein the linearity of each gain stage and mixer is increased by lowering a gain of a gain stage and mixer of each receiver if the SCMIR is above the associated SCMIR threshold and the in-band received signal strength is above the signal level threshold.

23. The apparatus of claim 21, further comprising a current control supplied by the digital signal processor to the gain stage and mixer of each receiver, wherein the linearity of each gain stage and mixer is increased by increasing the current to the gain stage and mixer of each receiver if the SCMIR is above the associated SCMIR threshold and the in-band received signal strength is below the signal level threshold.

24. The apparatus of claim 21, wherein the SCMIR is determined by $$SCMIR=RSSI2-(2P_{tx}+RSSI1-2IP3+K)$$

where RSSI2 is the in-band received signal strength, $P_{tx}$ is the power level of the transmitter power amplifier, RSSI1 is the out-of-band received signal strength, IP3 is the input third-order intercept point, and K is a constant.

25. A method to reduce crossmodulation in a multimode radio communication device, the method comprising the steps of:

providing a multimode communication device with a transmitter, a first receiver, and a second receiver;

operating the second receiver in a channel bandwidth;

measuring a first signal strength in the receiver channel bandwidth, a second signal strength outside of the receiver channel bandwidth, and a power level of the transmitter;

determining a signal-to-crossmodulation interference ratio and a battery capacity of the device;

calculating a signal-to-crossmodulation interference ratio threshold;

comparing the ratio to the threshold and the first signal strength to a signal level threshold; and operating the device in compressed mode if the ratio is less than the threshold, the first signal strength is below a signal level threshold, and there is insufficient battery capacity.

* * * * *